United States Patent
Saito et al.

(10) Patent No.: US 8,115,870 B2
(45) Date of Patent: Feb. 14, 2012

(54) CONTENT REPRODUCING SYSTEM AND CONTENT REPRODUCING METHOD

(75) Inventors: Kenichi Saito, Kanagawa (JP); Haruyuki Miura, Kanagawa (JP); Takashi Sasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1379 days.

(21) Appl. No.: 11/651,381

(22) Filed: Jan. 9, 2007

(65) Prior Publication Data

US 2007/0236605 A1    Oct. 11, 2007

(30) Foreign Application Priority Data

Jan. 18, 2006   (JP) ................................. 2006-010275

(51) Int. Cl.
    *H04N 9/475* (2006.01)
(52) U.S. Cl. ......................... 348/512; 348/723; 348/714
(58) Field of Classification Search ................... 348/723, 348/478, 462, 482–485, 473, 476, 512, 515, 348/738, 725; 386/39, 96, 102, 104; *H04N 9/475*
    See application file for complete search history.

(56) References Cited

U.S. PATENT DOCUMENTS

| 5,550,589 A * | 8/1996 | Shiojiri et al. ............. 348/386.1 |
| 7,394,499 B2 * | 7/2008 | Okamoto et al. ............. 348/478 |
| 2006/0209880 A1 * | 9/2006 | Chang et al. ................. 370/464 |

FOREIGN PATENT DOCUMENTS

| JP | 2002-152282 A | 5/2002 |
| JP | 2002-290921 A | 10/2002 |
| JP | 2003-109298 A | 4/2003 |
| JP | 2003-272301 A | 9/2003 |
| JP | 2004-127123 A | 4/2004 |

* cited by examiner

*Primary Examiner* — Trang U Tran
(74) *Attorney, Agent, or Firm* — Wolf, Greenfield & Sacks, P.C.

(57) ABSTRACT

A content reproducing system having a first device and a second device connected to each other through a transmission path for transmitting content data is provided. The first device includes an outputting unit and an output controlling unit configured to output the content data output from the outputting unit a transmission rate. The second device includes an inputting unit, a storage unit configured to store the content data input by the inputting unit, a transmission rate controlling unit configured to control the transmission rate in accordance with the amount of content data stored in the storage unit, a reproduction clock generating units configured to generate a reproduction clock for reproducing the content data, and a reproducing units configured to read out the content data from the storage unit on the basis of the reproduction clock generated by the reproduction clock generating unit and reproduce the content data.

6 Claims, 10 Drawing Sheets

| PIN | SIGNAL | PIN | SIGNAL |
|---|---|---|---|
| 1 | TMDS DATA 2+ | 2 | TMDS DATA 2 SHIELD |
| 3 | TMDS DATA 2− | 4 | TMDS DATA 1+ |
| 5 | TMDS DATA 1 SHIELD | 6 | TMDS DATA 1− |
| 7 | TMDS DATA 0+ | 8 | TMDS DATA 0 SHIELD |
| 9 | TMDS DATA 0− | 10 | TMDS CLOCK+ |
| 11 | TMDS DATA CLOCK SHIELD | 12 | TMDS CLOCK− |
| 13 | CEC | 14 | RESERVE |
| 15 | SCL | 16 | SDA |
| 17 | DDC/CEC GROUND | 18 | +5V POWER |
| 19 | HOT PLUG DETECTION | | |

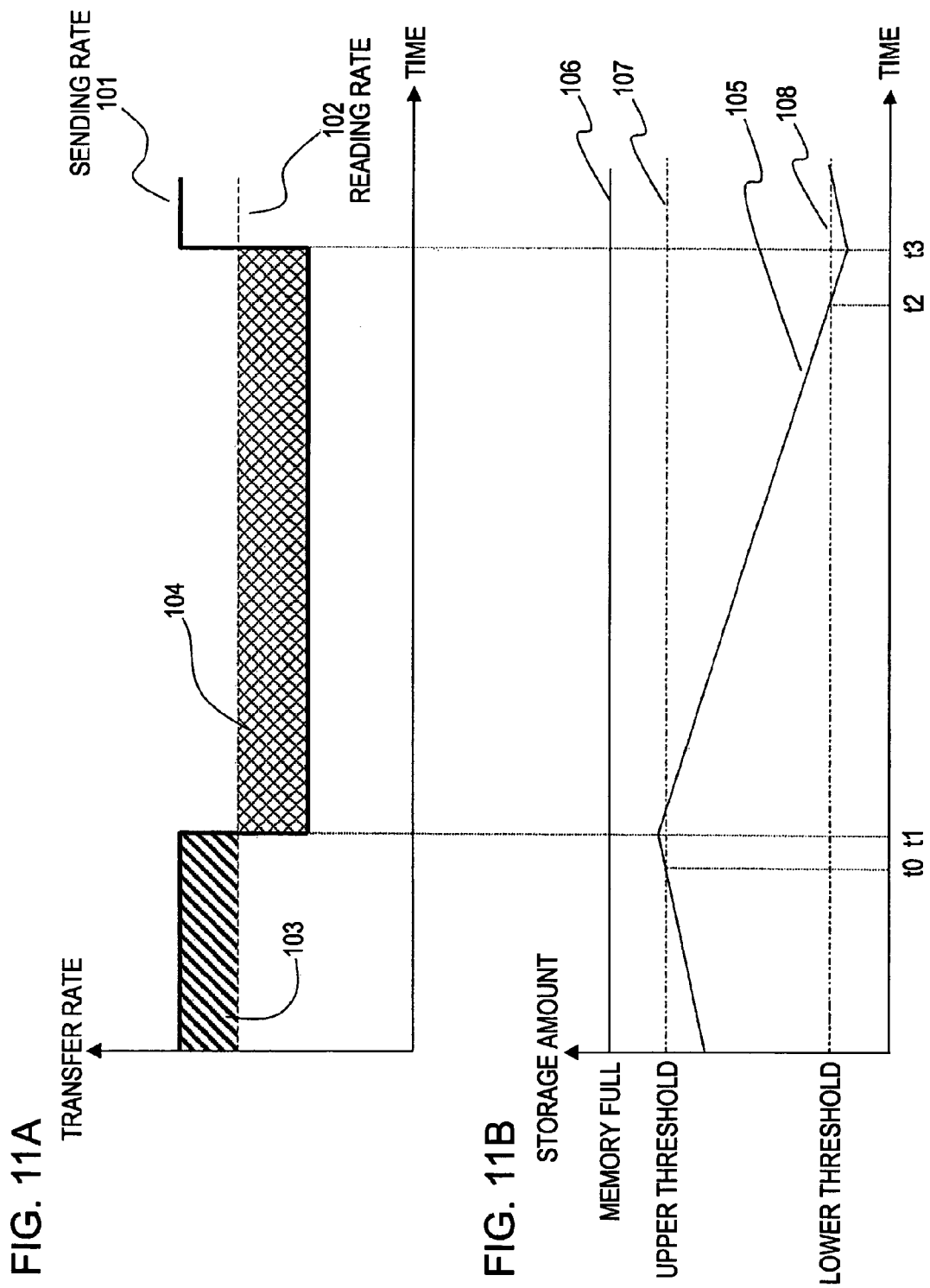

CONTENT REPRODUCING SYSTEM AND CONTENT REPRODUCING METHOD

CROSS REFERENCES TO RELATED APPLICATIONS

The present invention contains subject matter related to Japanese Patent Application JP 2006-010275 filed in the Japanese Patent Office on Jan. 18, 2006, the entire contents of which are incorporated herein by reference.

BACKGROUND OF THE INVENTION

1. Field of the Invention

The present invention relates to content reproducing systems and content reproducing methods for inputting/outputting content signals and reproducing contents using HDMI (High-Definition Multimedia Interface) or IEEE (Institute of Electrical and Electronic Engineers) 1394 connections.

2. Description of the Related Art

Systems for outputting sound are known. In such a known system, a source device for outputting a content signal and a sink device for receiving the content signal are connected through an HDMI or an IEEE 1394 connection, and sound is output from a speaker or the like connected to the sink device (See for example, Japanese Unexamined Patent Application Publication No. 2003-109298 and Japanese Unexamined Patent Application Publication No. 2003-272301).

For example, as shown in FIG. 1, a sink device 102 stores an audio signal received from a source device 101 such as an audio player, in a ring buffer 103. When the audio signal is reproduced, a controller 104 generates a reproduction clock in a PLL (phase locked loop) 105 on the basis of a transmission rate of the audio signal and reads out the audio signal from the ring buffer 103 on the basis of the reproduction clock.

SUMMARY OF THE INVENTION

However, such a reproduction clock is generated in synchronization with a transmission clock for audio signal transmission and essentially contains jitter components. This causes difficulty in reproducing an audio signal with accuracy.

The present invention has been made in view of the above circumstance. Accordingly, there is a need for a content reproducing system and a content reproducing method for reproducing contents such as music and video with high sound quality.

According to an aspect of the present invention, there is provided a content reproducing system having a first device and a second device connected to each other through a transmission path for transmitting content data. The first device includes outputting means configured to output the content data through the transmission path and output controlling means configured to output the content data output from the outputting means at a transmission rate requested by the second device. The second device includes inputting means configured to input the content data sent from the outputting means through the transmission path, storing means configured to store the content data input by the inputting means, transmission rate controlling means configured to control the transmission rate in accordance with the amount of content data stored in the storing means, reproduction clock generating means configured to generate a reproduction clock for reproducing the content data, and reproducing means configured to read out the content data from the storing means on the basis of the reproduction clock generated by the reproduction clock generating means and reproduce the content data.

According to another aspect of the present invention, there is provided a content reproducing method for a content reproducing system having a first device and a second device connected through a transmission path for transmitting content data. This content data reproducing method includes the steps of causing the first device to output the content data at a transmission rate requested in accordance with the amount of content data stored in storing means provided in the second device, and causing the second device to generate a reproduction clock for reproducing the content data output from the first device and reads out the content data from the storing means on the basis of the reproduction clock so as to reproduce the content data.

According to further aspect of the present invention, a data reproducing device connected through a transmission path to a first device for transmitting content data at a predetermined transmission rate includes transmitting and receiving means configured to receive data through the transmission path connected to the first device and to transmit a command, buffering means configured to temporarily store the data transmitted from the first device and received by the transmitting and receiving means, data reproducing means configured to read out the data stored in the buffering means at a predetermined reading rate, storage amount detecting means configured to detect the amount of data temporarily stored in the buffering means, comparing means configured to compare the amount of stored data detected by the storage amount detecting means with a first predetermined threshold and with a second predetermined threshold, and controlling means configured to perform control such that a command instructing a change in a data transmission rate is transmitted from the transmitting and receiving means to the first device, on the basis of the result of the comparison performed by the comparing means.

BRIEF DESCRIPTION OF THE DRAWINGS

FIG. 11A illustrates a relationship between a rate of data reading from a buffer and a rate of data transmission from a source device; and FIG. 11B illustrates changes in the amount of data stored in a buffer.

DESCRIPTION OF THE PREFERRED EMBODIMENTS

In the following, the preferred embodiments of the present invention will be described in detail with reference to the accompanying drawings. A content reproducing system described as an example of an embodiment of the present invention includes a source device, such as a DVD (Digital Versatile Disk) player, for outputting a content signal including an audio signal and a video signal and a sink device, such as an AV amplifier, for inputting the content signal. The source device and the sink device are connected through a transmission cable such as an HDMI cable and an IEEE 1394 cable.

First Embodiment

Figure 1:
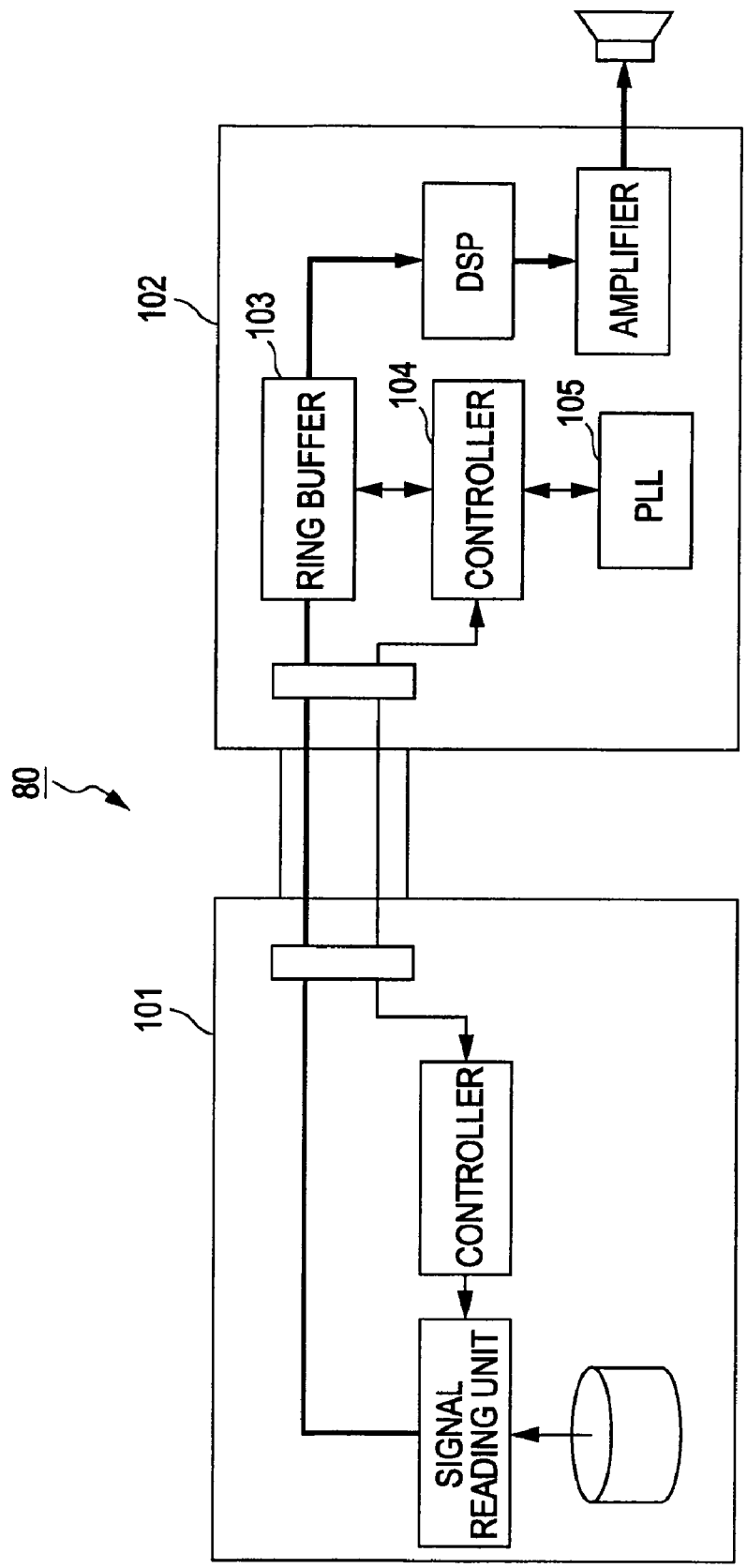
FIG. 1 illustrates a known content reproducing system.
Figure 2:
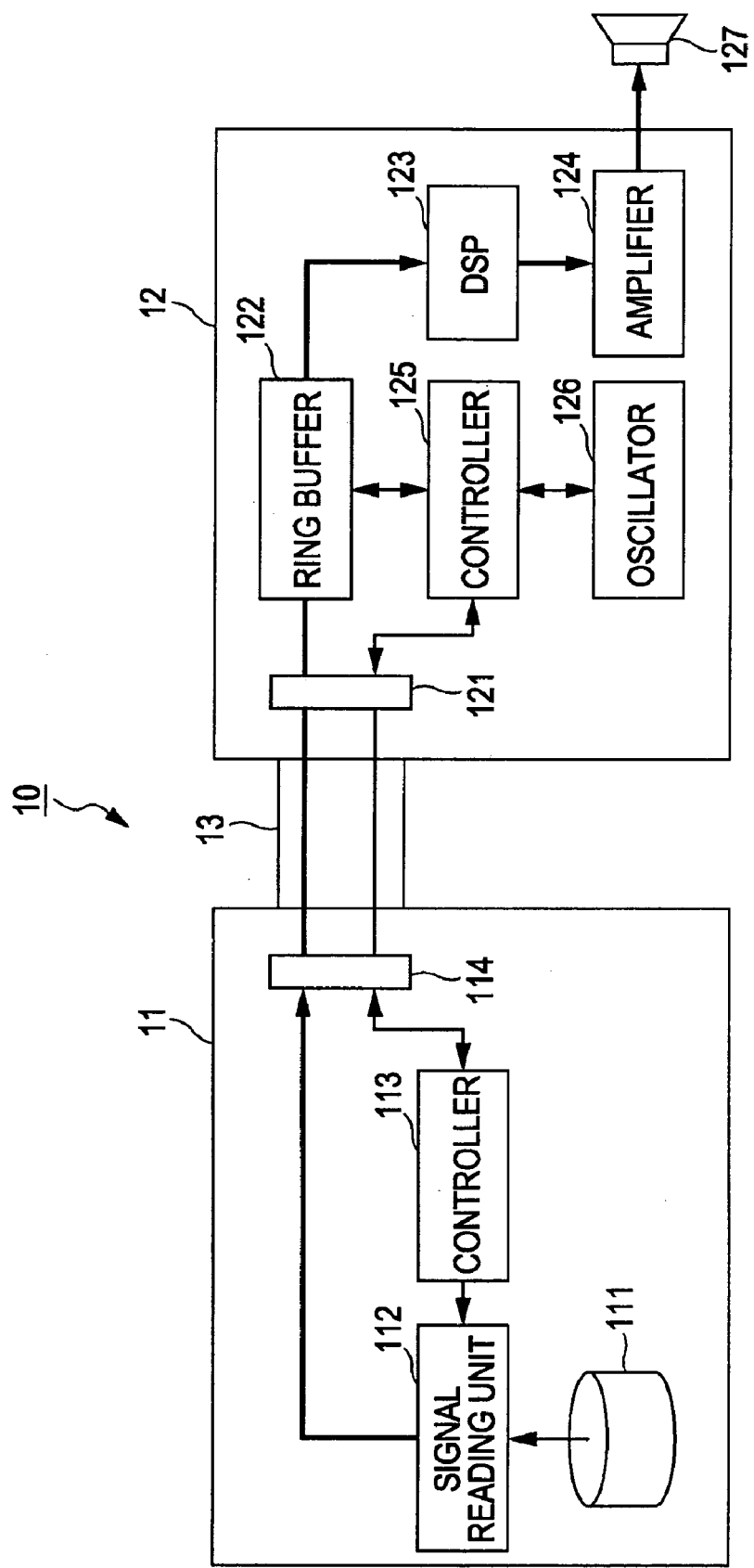
FIG. 2 illustrates a content reproducing system according to an embodiment.

Referring to FIG. 2, a content reproducing system 10 according to the present embodiment is illustrated. The content reproducing system 10 includes a source device 11 such as a DVD player for outputting an audio signal and a sink device 12 such as an AV amplifier. The source device 11 and the sink device 12 are connected through an HDMI cable 13.

The source device 11 includes a signal reading unit 112, a controller 113 for controlling transmission of an audio signal which is performed through the HDMI cable 13, and an HDMI terminal 114.

A disc 111 can be, for example, an optical disc on which audio data is recorded as pits and lands. The signal reading unit 112 optically reads out an audio signal recorded on the disc 111 using an optical pickup, for example. The controller 113 controls a transmission rate, at which the audio signal is transmitted, in accordance with a request to be sent from the sink device 12, which will be described below.

Figures 3, 4:
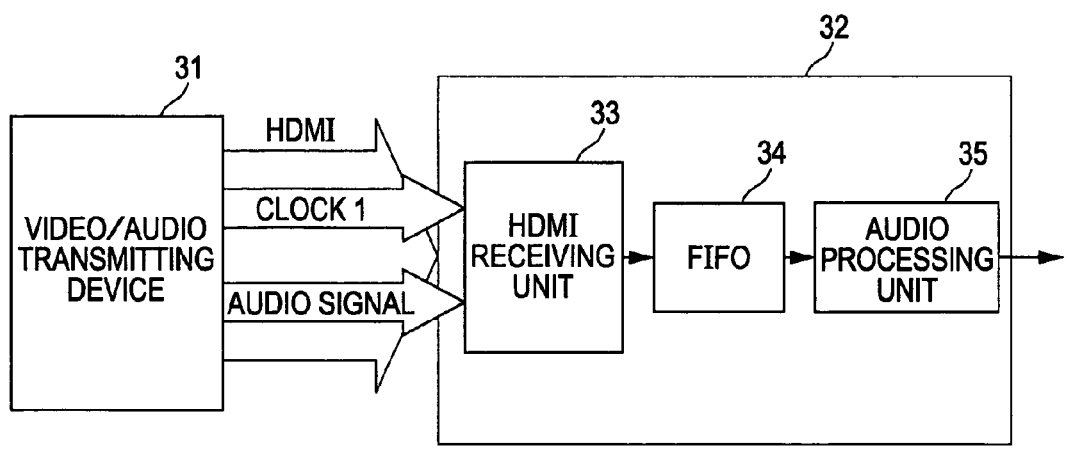
FIG. 3 describes an HDMI terminal.
FIG. 4 is a block diagram schematically illustrating an audio signal reproducing operation.

As described in FIG. 3, the HDMI terminal 114 has 19 pins and is connected with a terminal of the HDMI cable 13. HDMI is based on the TMDS (Transmission Minimized Differential Signaling) technology, similarly to DVI (Digital Visual Interface), and includes three TMDS data paths and one TMDS clock transmission path. A CEC (Consumer Electronics Control) signal described in FIG. 3 is a control signal. A DDC (Display Data Channel) signal contains DDC clock information and DDC data and is used for transmitting display information (DDC). A +5V power signal and a hot plug detection signal described in FIG. 3 are level signals indicative of a status of connection between the source device 11 and the sink device 12. For example, when the source device 11 is activated, the +5V power signal becomes a high level. In addition, when the +5V power signal is input to the sink device 12 while the source device 11 and the sink device 12 are connected, the hot plug detection signal becomes a high level. The HDMI cable 13 also has a plurality of SCL (Serial Clock) and SDA (Serial Data) lines, reserve lines, and shield (GND) lines.

The sink device 12 includes an HDMI terminal 121, a ring buffer 122 for temporarily storing a music, a DSP (digital signal processor) 123 for processing the music signal, an amplifier 124 for amplifying the music signal, a controller 125 for controlling a transmission rate in accordance with the amount of data stored in the ring buffer 122 and also controlling individual components of the sink device 12, and an oscillator 126.

The HDMI terminal 121 has a configuration similar to the HDMI terminal 114 of the source device 11 described above. The ring buffer 122 can be a memory such as a FIFO (first-in first-out) for temporarily storing a music signal. The DSP 123 performs processing on the music signal into an audio signal such as a 5.1-channel audio signal and a 7.1-audio channel signal. The amplifier 124 amplifies the signal processed by the DSP 123. The amplified audio signal is output to a speaker 127 for sound output. The controller 125 controls a transmission rate in accordance with the amount of data stored in the ring buffer 122 and also controls reproduction based on a clock from the oscillator 126.

FIG. 4 is a block diagram schematically illustrating a audio reproducing operation performed by the content reproducing system 10 described above. A HDMI receiving unit 33 illustrated in FIG. 4 corresponds to the HDMI terminal 121 and the controller 125 of the sink device 12 illustrated in FIG. 2. In addition, a FIFO 34 corresponds to the ring buffer 122, and an audio processing unit 35 corresponds to the DSP 123, the amplifier 124, the controller 125, and the oscillator 126.

A video/audio transmitting device 31, which corresponds to the source device 11, transmits an audio signal through a TMDS data path for HDMI and also transmits a clock 1 synchronized with a transmission rate using a TMDS clock transmission path.

A video/audio transmitting and receiving device 32, which corresponds to the sink device 12, receives an audio signal and the clock 1 using the HDMI receiving unit 33. The video/audio transmitting and receiving device 32 stores the audio signal in the FIFO 34 and reads out the stored audio signal on the basis of a clock 2 generated by the oscillator 126, which is asynchronous with the clock 1. Then, audio processing is performed in the audio processing unit 35. For clock information for generating the clock 2, an Audio Info Frame Data Packet included in an audio signal can be used.

Thus, the video/audio transmitting and receiving device 32 reads out an audio signal on the basis of the clock 2 serving as a reproduction reference clock which is independent of the clock 1, without using the clock 1 based on the PLL, which essentially contains jitter components. The video/audio transmitting and receiving device 32 then processes the read signal. With this arrangement, audio reproduction with increased sound quality can be realized.

It is preferable that the video/audio transmitting and receiving device 32 communicates with the video/audio transmitting device 31 using a CEC signal, for example, and controls a transmission rate of an audio signal transmitted from the video/audio transmitting device 31 on the basis of the amount of data stored in the FIFO 34. This can prevent overflow or underflow of the FIFO 34 which occurs due to the asynchronism between the clock 1 synchronized with a transmission rate received from the video/audio transmitting device 31 and the clock 2 generated by the oscillator 126.

Figure 5:
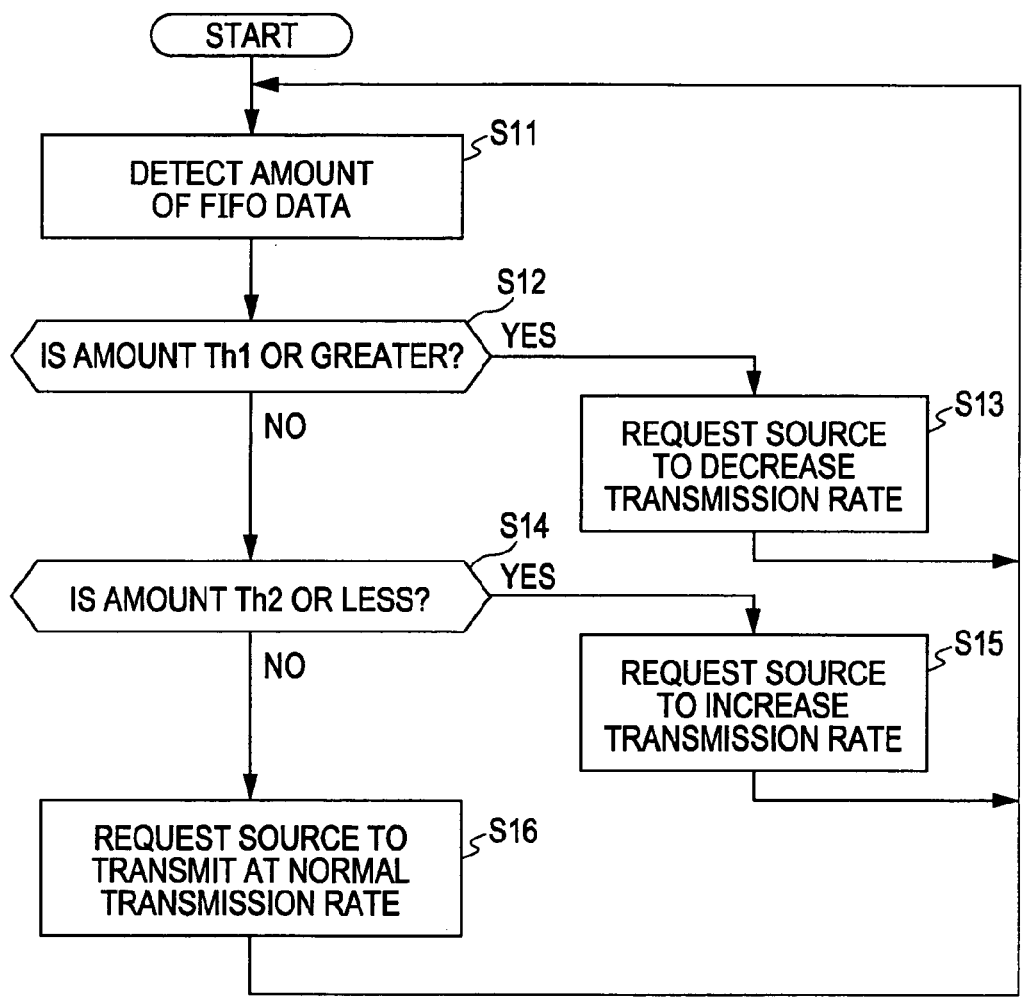
FIG. 5 is a flowchart illustrating an example of control operation of a transmission rate of an audio signal.

Now, a procedure of control of a transmission rate of an audio signal performed during the reproducing operation described above will be described with reference to a flowchart shown in FIG. 5.

At STEP S11, the HDMI receiving unit 33 detects the amount of data in the FIFO 34 at predetermined time intervals. Then, the HDMI receiving unit 33 requests the video/audio transmitting device 31 for a change in transmission rate on the basis of predetermined thresholds Th1 and Th2 (Th1>Th2).

At STEP S12, the HDMI receiving unit 33 determines whether or not the amount of data in the FIFO 34 is the threshold Th1 or greater. If the amount of data in the FIFO 34 is determined to be the threshold Th1 or greater in STEP S12, the HDMI receiving unit 33 requests the video/audio transmitting device 31, which is the source device, to decrease the transmission rate, at STEP S13. Thus, an audio signal will be output from the video/audio transmitting device 31 at a transmission rate decreased by 1 percent. Consequently, the amount of FIFO data, which has been increasing, recovers to a normal amount, and thus overflow is prevented. In STEP S12, if it is determined that the amount of data in the FIFO 34 is less than the threshold Th1, the procedure proceeds to STEP S14.

At STEP S14, the HDMI receiving unit 33 determines whether or not the amount of data in FIFO 34 is the threshold Th2 or less. If the amount of data in FIFO 34 is determined to be the threshold Th2 or less in STEP S14, the HDMI receiving unit 33 requests the video/audio transmitting device 31 to increase the transmission rate, at STEP S15. Thus, an audio signal will be output from the video/audio transmitting device 31 at a transmission rate increased by 1 percent. Consequently, the amount of the FIFO data, which has been decreasing, recovers to a normal amount, and thus underflow can be prevented. If it is determined that the amount of data in FIFO 34 is greater than the threshold Th2 in STEP S14, the procedure proceeds to STEP S16.

At STEP S16, the HDMI receiving unit 33 requests the video/audio transmitting device 31 to transmit an audio signal at a normal transmission rate if it is determined in STEP S14 that the amount of data in the FIFO 34 is greater than the threshold Th2 (i.e., the amount of data in FIFO 34 is less than the threshold Th1 and greater than the threshold Th2).

Thus, the HDMI receiving unit 33 requests the video/audio transmitting device 31 for signal transmission at a transmission rate in accordance with the amount of data in the FIFO 34. This arrangement prevents overflow or underflow of the FIFO 34 even if the clock 1, which is synchronized with a transmission rate transmitted with an audio signal from the video/audio transmitting device 31 and the clock 2, which is generated by the oscillator 126, are asynchronous with respect to each other.

Figure 6:
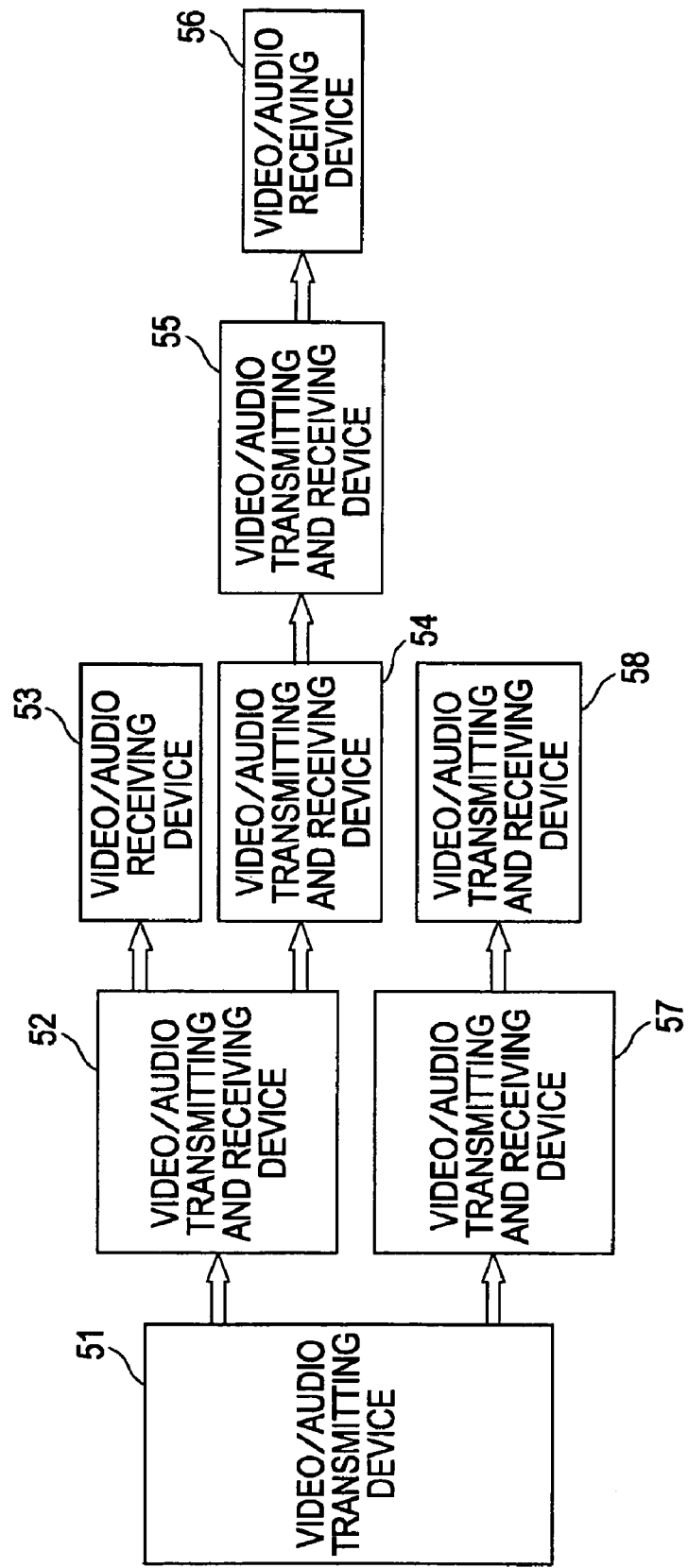
FIG. 6 illustrates a content reproducing system in which a plurality of video/audio transmitting and/or reproducing devices are connected.

As illustrated in FIG. 6, a video/audio transmitting device 51 and a plurality of devices 52 to 58 can be connected through HDMI. For example, when the a video/audio transmitting device 51 and the video/audio transmitting and receiving device 52 correspond to the video/audio transmitting device 31 and the video/audio transmitting and receiving device 32 illustrated in FIG. 4, respectively, the video/audio transmitting and receiving device 52 illustrated in FIG. 6 can perform audio reproduction with accuracy.

In such a content reproducing system as illustrated in FIG. 6, when accurate audio reproduction is desired to be performed by using the video/audio transmitting and receiving device 52, mute control is performed on video/audio transmitting and/or receiving devices 53 to 58 arranged downstream of the video/audio transmitting and receiving device 52.

With this arrangement, when control of a transmission rate is performed between the video/audio transmitting device 51 and the video/audio transmitting and receiving device 52, for example, the video/audio transmitting and/or receiving devices 53 to 58 do not perform audio input. Thus, a system capable of accurately reproducing audio signals can be achieved even if the video/audio transmitting and/or receiving devices 53 to 58 are configured to generate clocks using PLLs on the basis of the clock 1 synchronized with a transmission rate transmitted with an audio signal and to reproduce the audio signal on the basis the clock generated using the PLL. In addition, such a system can be achieved even if the video/audio transmitting and/or receiving devices 53 to 58 are not capable of accurately outputting audio because of a change in the clock 1 caused by a change in the transmission rate.

Figure 7:
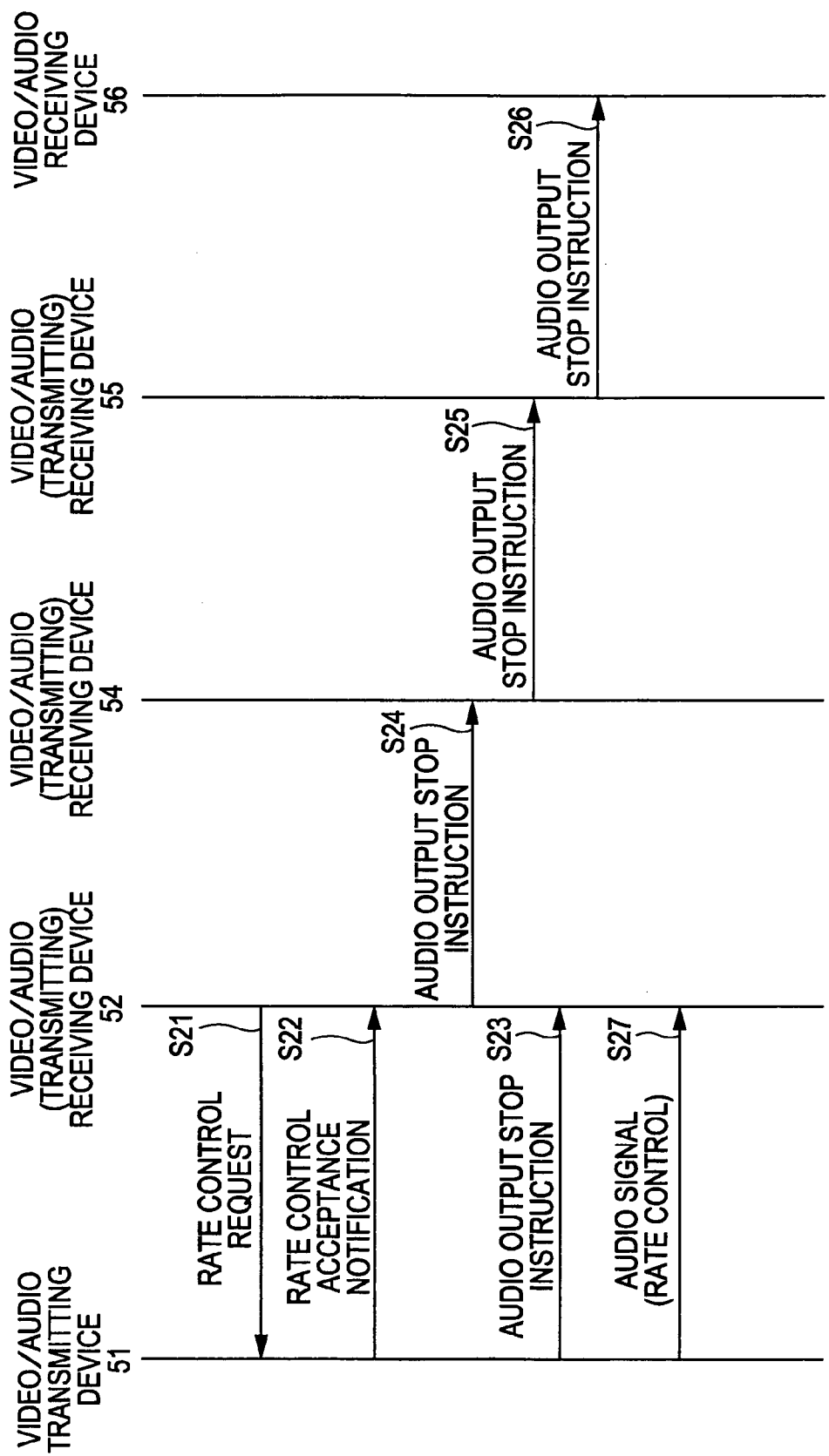
FIG. 7 illustrates transmission/reception of signal in mute control.

Referring now to FIG. 7, the mute control mentioned above will be described. FIG. 7 schematically illustrates signal transmission and reception between the video/audio transmitting device 51, the video/audio transmitting and receiving devices 52, 54, and 55, and the video/audio receiving device 56. Note that it is assumed that the video/audio transmitting and receiving device 52 is cable of performing rate control and reproducing audio signals with high sound quality, and the video/audio transmitting and/or receiving devices 53 to 58 are not capable of performing rate control and reproducing audio signals with high sound quality.

In order to perform rate control, the video/audio transmitting and receiving device 52 sends the a video/audio transmitting device 51 for outputting an audio signal a request for rate control, at STEP S21. In response to the rate control request, the a video/audio transmitting device 51 notifies the video/audio transmitting and receiving device 52 of acceptance of rate control if it adapts the rate control, at STEP S22. The video/audio transmitting device 51 stops audio output by stopping transmission of, for example, an audio sample packet, at STEP S23.

Upon receiving the rate control acceptance, the video/audio transmitting and receiving device 52 mutes itself and instructs the video/audio transmitting and receiving device 54 to stop audio output, at STEP 24. Similarly, each of the video/audio transmitting and receiving device 54 and the video/audio transmitting and receiving device 55 mutes itself and instruct the individual downstream device to stop audio output (STEP S25 and STEP S26). That is, the video/audio transmitting and/or receiving devices 54, 55, and 56 arranged downstream of the video/audio transmitting and receiving device 52 are caused to stop audio signal transmission.

To stop audio output, control information such as AVMute information can be used, if output of both video and audio is to be stopped. Instead of an instruction for stopping audio output, it can be configured such that the video/audio transmitting and receiving device 54 mutes itself when detecting the stop of audio output in the video/audio transmitting and receiving device 52. In this case, the downstream video/audio transmitting and/or receiving devices 55 and 56 similarly mute themselves.

The video/audio transmitting device 51 outputs an audio signal only to the video/audio transmitting and receiving device 52, which is notified of the rate control acceptance, at STEP S27. The video/audio transmitting and receiving device 52 then initiates the rate control of signal transmission between the video/audio transmitting device 51 and the video/audio transmitting and receiving device 52. Note that the rate control is similar to the control of transmission rate described using FIG. 5.

The video/audio transmitting and receiving device 52 unmutes itself when initiating buffering of an audio signal to the FIFO 34 and reproduces the buffered audio signal with accuracy in accordance with the clock 2 generated in the oscillator 126.

Thus, the video/audio transmitting and receiving device 52 causes the downstream devices to be muted so as to perform reproduction processing. With this arrangement, a reproducing system capable of accurately reproducing audio signals can be realized.

In the above embodiment, rate control is requested from a video/audio transmitting and/or receiving device which performs the rate control and reproduces audio signals with high sound quality. However, it can also be configured such that rate control is requested from a video/audio transmitting device for outputting an audio signal.

Figure 8:
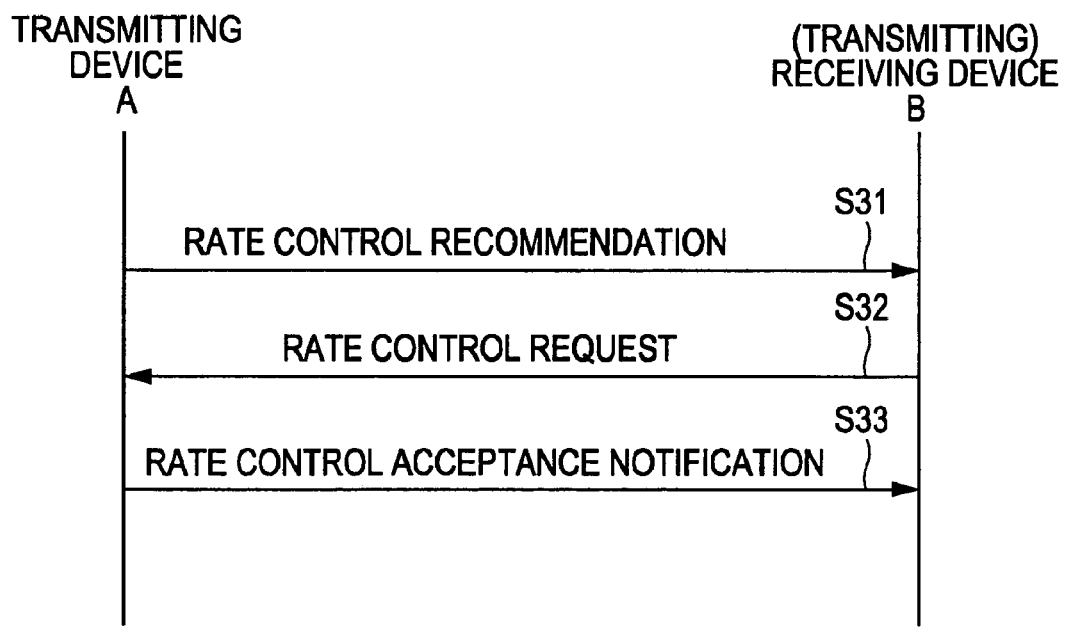
FIG. 8 illustrates another example of control operation of a transmission rate of an audio signal.

For example, as illustrated in FIG. 8, when transmitting a content for which rate control is allowed, a transmitting device transmits a (transmitting)/receiving device B information for recommending rate control STEP S31. In accordance with the received recommendation information, for example, the (transmitting)/receiving device B indicates on a display (not shown) that the contents can be reproduced with high quality. The (transmitting)/receiving device B displays a rate control button so as to inquire a user whether or not to perform rate control. If the rate control button is depressed by the user, the (transmitting)/receiving device B sends the transmitting device A a rate control request at STEP S32. The transmitting device A sends the (transmitting)/receiving device B a rate control acceptance notification in response to the received rate control request, at STEP S33. Then, the (transmitting)/receiving device B performs a reproducing operation similar to the reproducing operation described above.

Thus, with this arrangement, in which rate control is recommended by a transmission source which transmits a content signal, only content data permitting with high quality sound can efficiently be reproduced with high sound quality.

Referring now to FIG. 11A and FIG. 11B, an embodiment of the present invention will be described.

FIG. 11A illustrates a relationship between a rate at which data is read out from the ring buffer 122 of the sink device 12 to the DSP 123 and a rate at which data is transmitted from the source device 11 through the HDMI cable 13.

FIG. 11B illustrates the amount of data stored in the ring buffer 122.

At any time point prior to a time point t0, a data transmission rate 101 of the source device 11 is higher than the reading rate of the DSP 123, as indicated by a hatched portion 103 in FIG. 11A. Thus, the amount of data stored in the buffer 122 increases, and as a result exceeds a predetermined upper threshold 107 at the time point t0. At this time, the controller 125 of the sink device 12 detects that the data storage amount of the ring buffer 122 exceeds the upper threshold 107 at the time point t0. Then, the controller 125 requests the source device 11 through the HDMI cable 13 to decrease the data transmission rate.

On the basis of the request for a decrease in the data transmission rate from the sink device 12, the source device 11 decreases the data transmission rate 101, as indicated in a cross-hatched portion 104 in FIG. 11A. Thus, from a time point t1, the data storage amount of the ring buffer 122 starts decreasing with the decrease in the data transmission rate 101 of the source device 11, as illustrated in FIG. 11B.

From the time point t1, the state, in which the data transmission rate 101 of the source device 11 is lower than the reading rate 102 of data from the ring buffer 122, is maintained. Consequently, the data storage amount of the ring buffer 122 falls below a predetermined lower threshold 108 at a time point t2. The controller 125, when detecting that the data storage amount falls below the predetermined lower threshold 108 at t2, requests the source device 11 through the HDMI cable 13 to increase the data transmission rate 101.

On the basis of the request from the sink device 12 for a transmission rate increase, the source device 11 increases the data transmission rate 101 at a time point t3. Thus, the data storage amount of the ring buffer 122 starts increasing from the time point t3.

To simplify the description, it is indicated in FIG. 11A that every time the request from the sink device 12 is received, the data transmission rate 101 of the source device 11 changes so as to be constant. However, the request is not intended to maintain the data transmission rate 101 above or below the reading rate 102. For example, a temporary increase or decrease in the data transmission rate 101 due to a status of the source device 11 can be permitted as long as the increase or decrease does not affect the control of the ring buffer 122.

Second Embodiment

Figure 9:
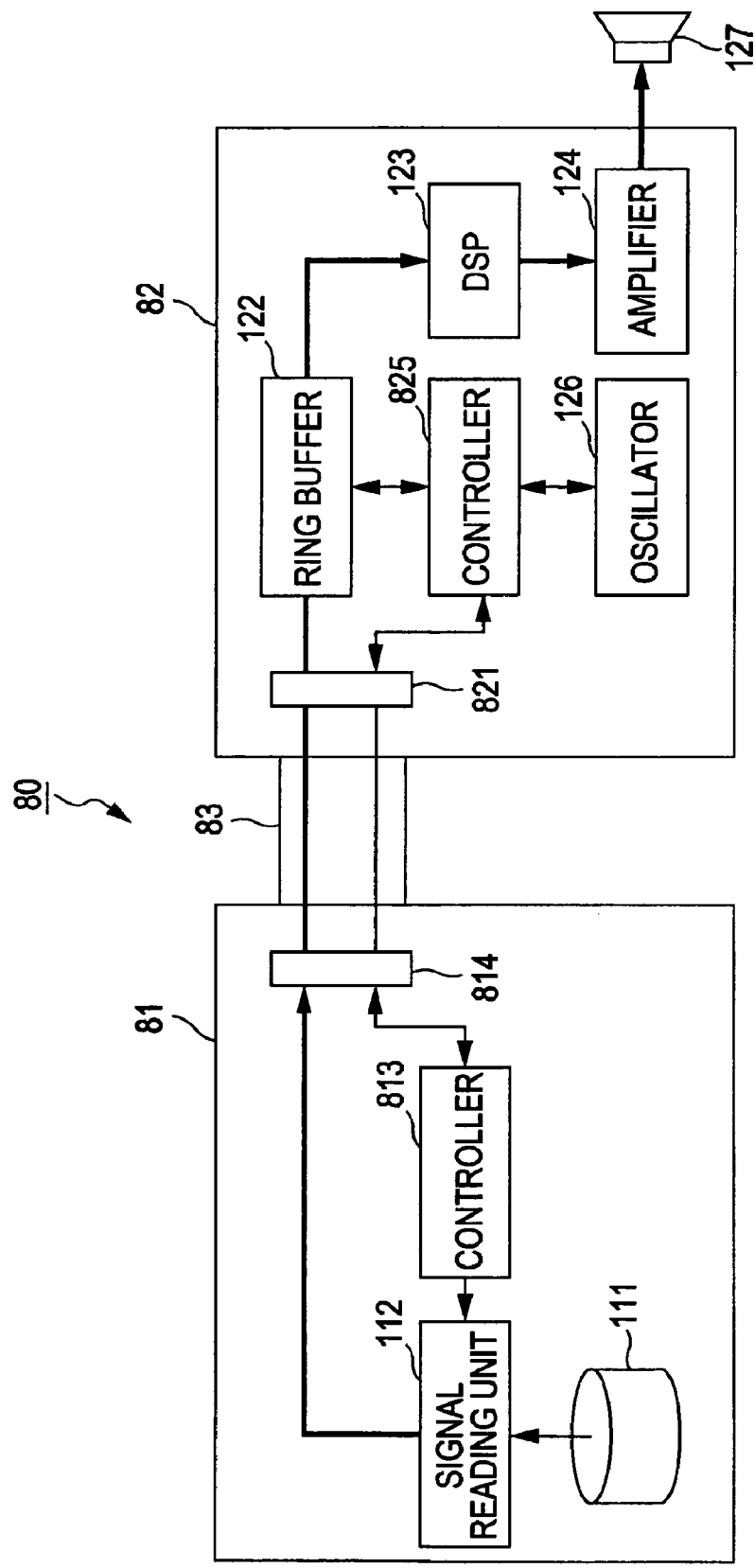
FIG. 9 illustrates a content reproducing system according to an embodiment.

FIG. 9 illustrates a content reproducing system 80 according to an embodiment of the present invention. This content reproducing system 80 includes a source device 81, such as a DVD player for outputting an audio signal and a sink device 82 such as an AV amplifier. The source device 81 and the sink device 82 are connected with each other through an IEEE 1394 cable 83. In FIG. 9, components similar to those described in the first embodiment is designated by the same reference numerals as those used in the first embodiment, and thus the description thereof will be omitted.

The source device 81 has a signal reading unit 112 for reading out an audio signal recorded in a disc 111, a controller 813 for controlling transmission of the audio signal performed through the IEEE 1394 cable 83, and an IEEE 1394 terminal 814.

The controller 813 controls a transmission rate of an audio signal in accordance with a request from the sink device 82, as will be described below. The an IEEE 1394 terminal 814 is connected to a terminal of the IEEE 1394 cable 83. The source device 81 and the sink device 82 connected through the IEEE 1394 cable 83 can determine statuses of the components and also control various components using an AV/C command. The connection based on the IEEE 1394 standard allows a daisy chain connection or a tree connection between up to 63 devices, and transmission rates of 100 Mbps, 200 Mbps, and 400 Mbps are set as standards.

The sink device 82 includes an IEEE 1394 terminal 821, a ring buffer 122 for temporarily storing a music signal, a DSP 123 for processing the music signal, an amplifier 124 for amplifying the music signal, a controller 825 for controlling a transmission rate in accordance with the amount of data stored in the ring buffer 122 and controlling various components of the sink device 82, and an oscillator 126.

The IEEE 1394 terminal 821 is similar to the an IEEE 1394 terminal 814 of the source device 81 described above. The controller 825 controls a transmission rate in accordance with the amount of data stored in the ring buffer 122 and also controls reproduction based on a clock from the oscillator 126.

Figure 10:
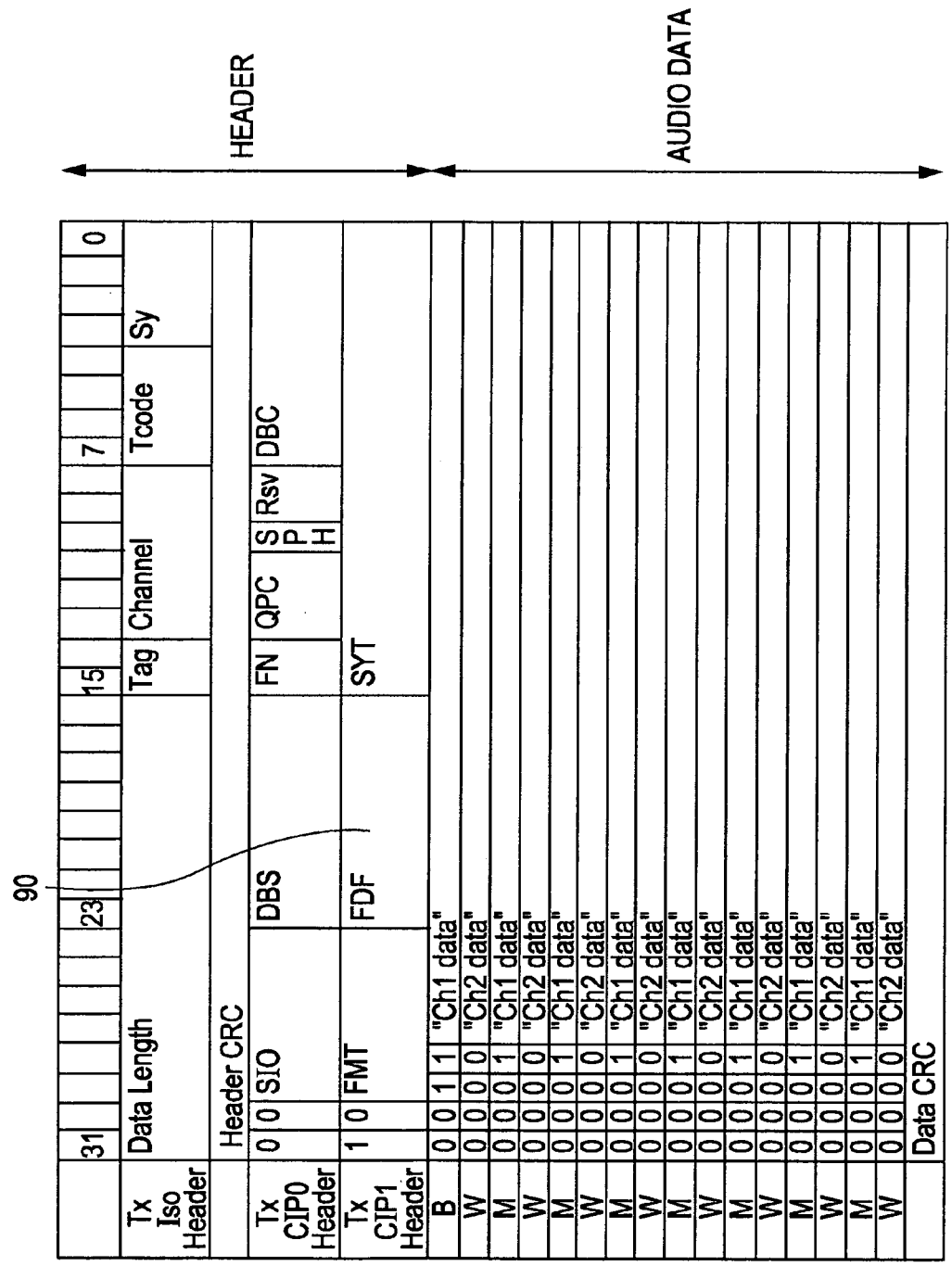
FIG. 10 illustrates contents of a packet.

In this content reproducing system 80 based on the IEEE 1394 standard, high sound quality reproduction can be performed using control information called an N flag. As illustrated in FIG. 10, this N flag is defined in an FDF (format dependent field) area 90 of a header and is indicative of whether or not a clock of an audio signal is reliable. For example, when the clock of an audio signal is reliable, the N flag is set to "0", and when a clock of an audio signal is not reliable, the N flag is set to "1".

In this content reproducing system using the N flag, the source device 81 transmits an audio signal with the N flag set to "0" so that the sink device 82 will not rely on the clock of the audio signal. Upon receiving the audio signal, the sink device 82 detects the N flag and stores the audio signal in the ring buffer 122. Then, the sink device 82 generates a reproduction clock using the oscillator 126 on the basis of the detected N flag and reads out the audio signal stored in the ring buffer 123 in accordance with the clock generated using the oscillator 126. Then, sink device 82 performs audio processing using the DSP 123, amplifier 124, etc.

Thus, the sink device 82 performs audio processing by reading out an audio signal in accordance with the clock generated in the oscillator 126, without using a PLL clock, which essentially contains jitter components. This arrangement permits audio reproduction with increased sound quality.

The controller 825 performs control of the transmission rate of an audio signal due to the asynchronism between the clock synchronized with a transmission rate transmitted from the video/audio transmitting device 81 and the clock generated by the oscillator 126. The control performed by the controller 825 is similar to the control operation described using the flowchart of FIG. 5. That is, the controller 825 performs rate control that is performed by the HDMI receiving unit 33.

In addition, as illustrated in FIG. 6, in a case where the source device 81 and a plurality of repeater devices or sink devices are connected, it can also be configured such that repeater devices or sink devices arranged downstream of a device, which is intended for reproduction with high sound quality, can be muted, similarly to the system based on HDMI described above. For example, a sink device 82, by which audio reproduction with high sound quality is desired to be performed, can stop audio output from all the other devices using AV/C commands. Then the sink device 82 unmutes audio output only from the source device 81, which is the source of audio signals, so as to receive audio signals from the source device 81. With this arrangement, a system similar to the system based on HDMI described above can be realized.

It should be understood by those skilled in the art that various modifications, combinations, sub-combinations and alterations may occur depending on design requirements and other factors insofar as they are within the scope of the appended claims or the equivalents thereof.

What is claimed is:

1. A data reproducing device connected through a transmission path to a first device for transmitting content data at a predetermined data transmission rate, the data reproducing device comprising:
    transmitting and receiving means configured to receive data through the transmission path connected to the first device and to transmit a command;
    buffering means configured to temporarily store the data transmitted from the first device and received by the transmitting and receiving means;
    data reproducing means configured to read out the data stored in the buffering means at a predetermined reading rate;
    storage amount detecting means configured to detect an amount of data temporarily stored in the buffering means;
    comparing means configured to compare the amount of stored data detected by the storage amount detecting means with a first predetermined threshold and with a second predetermined threshold; and
    controlling means configured to perform control such that a command instructing a change in the data transmission rate is transmitted from the transmitting and receiving means to the first device, on the basis of the result of the comparison performed by the comparing means.

2. The data reproducing device of claim 1,
    wherein the controlling means sends the first device a command instructing a decrease in the data transmission rate when it is determined that the amount of stored data in the buffering means exceeds the first threshold, and sends the first device a command instructing an increase in the data transmission rate when it is determined that the amount of stored data in the buffering means falls below the second threshold.

3. The data reproducing device of claim 1, further comprising connecting means configured to connect the data reproducing device to another data reproducing device,
    wherein when control of the amount of stored data is performed, data transfer from the first device to the other data reproducing device connected by the connecting means is stopped.

4. The data reproducing device of claim 1,
    wherein when control of the amount of storage data is performed, the data reproducing device sends the first device a command verifying that a change in the data transmission rate is allowed.

5. The data reproducing device of claim 1,
    wherein when control of the amount of storage data is performed, the data reproducing means temporarily mutes reproduction output of the data reproducing device.

6. A data reproducing device connected through a transmission path to a first device for transmitting content data at a predetermined transmission rate, the data reproducing device comprising:
    a transmitting and receiving unit configured to receive data through the transmission path connected to the first device and to transmit a command;
    a buffering unit configured to temporarily store the data transmitted from the first device and received by the transmitting and receiving unit;
    a data reproducing unit configured to read out the data stored in the buffering unit at a predetermined reading rate;
    a storage amount detecting unit configured to detect an amount of data temporarily stored in the buffering unit;
    a comparing unit configured to compare the amount of stored data detected by the storage amount detecting unit with a first predetermined threshold and with a second predetermined threshold; and
    a controlling unit configured to perform control such that a command instructing a change in a data transmission rate is transmitted from the transmitting and receiving unit to the first device, on the basis of the result of the comparison performed by the comparing unit.

* * * * *